May 5, 1964

J. H. WILSON 3,131,577

CRANK ASSEMBLY

Original Filed Jan. 7, 1955

*John Hart Wilson*
INVENTOR.

BY

*Wayland D. Keith*
HIS AGENT.

John Hart Wilson
INVENTOR.

BY Wayland D. Keith
HIS AGENT.

May 5, 1964
J. H. WILSON
3,131,577
CRANK ASSEMBLY
Original Filed Jan. 7, 1955
3 Sheets-Sheet 3
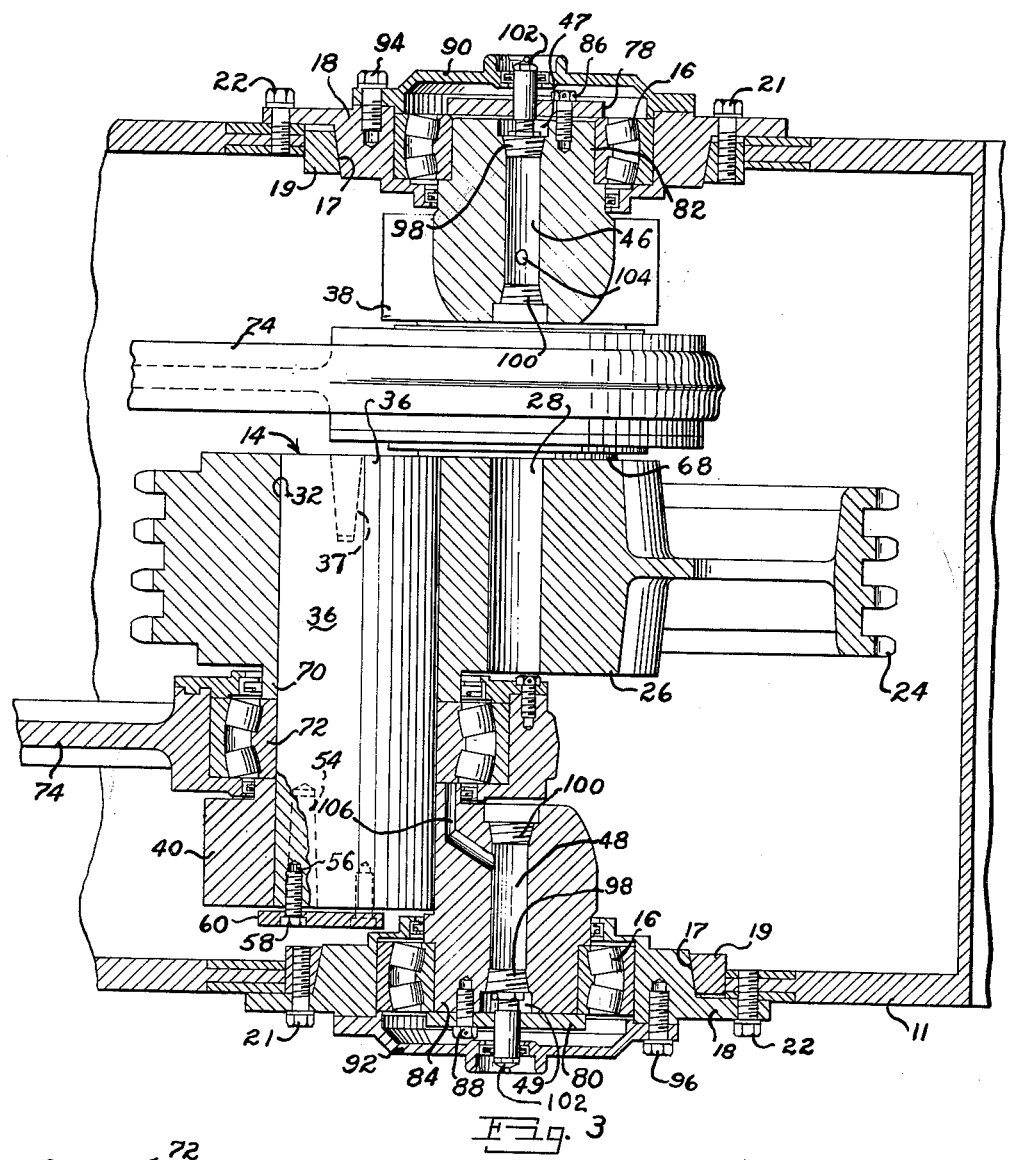
John Hart Wilson
INVENTOR.
BY Wayland D. Keith
HIS AGENT.

United States Patent Office 3,131,577
Patented May 5, 1964

3,131,577
CRANK ASSEMBLY
John Hart Wilson, % Wilson Mfg. Co., P.O. Box 1031, Wichita Falls, Tex.
Original application Jan. 7, 1955, Ser. No. 480,445, now Patent No. 2,899,742, dated Aug. 18, 1959. Divided and this application Mar. 26, 1959, Ser. No. 802,201
2 Claims. (Cl. 74—597)

This present application is a division of my prior application Ser. No. 480,445, filed January 7, 1955 for Crank Assembly, now Patent No. 2,899,742, granted August 18, 1959.

This invention relates to heavy duty pumps and like machinery, and particularly to a crank assembly suitable for use, for example, in mud pumps such as those used in the drilling of oil wells, where extremely great thrust on the piston is required, and where tremendous power must be supplied to a relatively small pump.

Various types of cranks have been used heretofore, including that covered by Patent No. 2,249,802 issued to the present applicant. The crank disclosed in this patent comprises a steel casting somewhat in the shape of the letter S and to which a sprocket is attached, and to which throw blocks are attached at each end of the center member. This type of crank was made and incorporated into a number of pumps, but is commercially unsatisfactory, since it has been found to be almost impossible to procure steel castings which are completely free of flaws.

According to the present invention, which has been designed to overcome the aforesaid difficulty, the sprocket also serves as the central portion of the crank assembly, and the two crank shafts, which are assembled with the sprocket by means of shrink fits, as well as taper pin keys, constitute a crank assembly far superior to the type mentioned above.

Various other types of cranks have been used for oil field mud pumps, some of which are made of steel castings or even forgings, and in which the connecting rod bearings are made much larger than necessary for intended capacity so as to enable their passage over bent portions of the shaft.

Shafts of this type are excessively long and they require large and expensive connecting rod bearings, which, because of their other requirements, cannot be of the self-aligning type. Since the shaft will, of necessity, deflect upon the application of a great load thereon, these bearings should be of the self aligning type, but in the case of the construction in question, the use of such bearings is practically impossible, both because of the very large size required, and because non-standard sizes of bearings are required.

Still other types of pumps make use of an eccentric instead of a crank, but these require very- large connecting rod bearings, which in turn, are very expensive and, moreover, are not of the self aligning type. This type of construction, therefore is quite large, cumbersome, and costly to build.

The type of crank embodied in the present invention permits the use of self aligning bearings, both as main bearings and as connecting rod bearings, and permits the use of a shaft which is shorter and more compact than is suitable for use with any construction employed heretofore. Therefore, there is less bending strain on the shaft, and the bearings can be removed for replacement, should they become worn or damaged in service.

The crank shaft embodied in the present invention is assembled of several component parts, and thus the metal in a particular part, preferably a forging, can be of the proper alloy and strength so that the unit, when assembled, gives the maximum performance with the minimum cost, and should any imperfections occur in a particular part, that one part only can be discarded without the necessity of discarding the entire assembly. The relatively short straight shaft of the present invention can easily be tested for flaws and defects by high-frequency-sound testing devices.

It has been found that the crank pins, when made of the same material as the rest of the crank assembly, will break before any other portion of the crank assembly. With the present arrangement, the crank pins can be made of a more suitable type of metal and alloy so as to make them stronger, so they will not have to be replaced.

An object of this invention is to provide a crank shaft unit, wherein the several component parts are assembled securely together to form a crank shaft for pumps, such as mud pumps and the like, engines or other machinery.

Another object of this invention is to provide a crank shaft assembly wherein the crank pins consist of independent lengths of shaft, on which the crank arms and the intermediate portion of the crank are secured together so as to present a crank shaft that may be assembled about a bearing.

Yet another object of this invention is to provide a crank unit which may be disassembled and reassembled to enable the replacement or repair of the parts thereof, and particularly the bearings employed therewith.

Still another object of this invention is to provide a crank shaft that is so constructed that the various parts may be assembled together on a line-up bar and a drilling operation performed thereon, which will enable reassembly after disassembly, without using a line-up bar.

A still further object of the invention is to provide a crank shaft assembly wherein the removable portions on the end can be perfectly aligned so that the crank sprocket will run true when the assembly turns on the main bearings, and also so that the crank pins can be removed for replacement of the bearings, and when reinstalled on the center portion of the crank, will align so that the sprocket will run true and the cranks will be in proper relation.

With these objects in mind and others which will become manifest as the description proceeds, reference is to be had to the accompanying drawings in which like reference characters designate like parts in the several views thereof, in which:

FIG. 3 is a sectional view taken on the line 3—3 of FIG. 2, looking in the direction indicated by the arrows;

FIG. 4 is a fragmentary detail view showing the manner in which the crank throws are secured to the crank shaft by means of taper pins;

Figure 6:
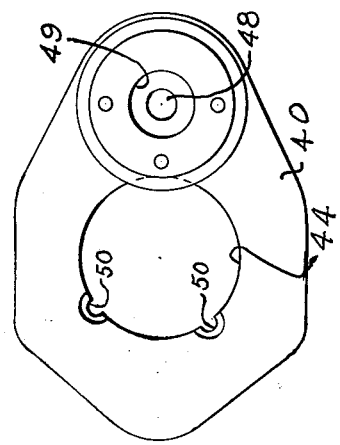
FIG. 6 is an elevational view of a crank shown apart from the crank shaft.

With more detailed reference to the drawing, the numeral 11 designates the crank case housing of a pump, in which a crank member, generally designated at 14, is journaled in bearings 16, mounted within bearing housings 18 which are removably secured to the housing 11 by means of cap screws 22. The bearing housing 18 is supported in the housing 11 by means of the tapered wedge blocks 19 which are pulled into place by means of cap screws 21. These wedge blocks seat against the tapered surface 17 and take up all the play between the bearing housing and the frame. And if, due to wear, play should become apparent, the wedge members can again be taken up by means of the cap screws 21.

Figure 1:
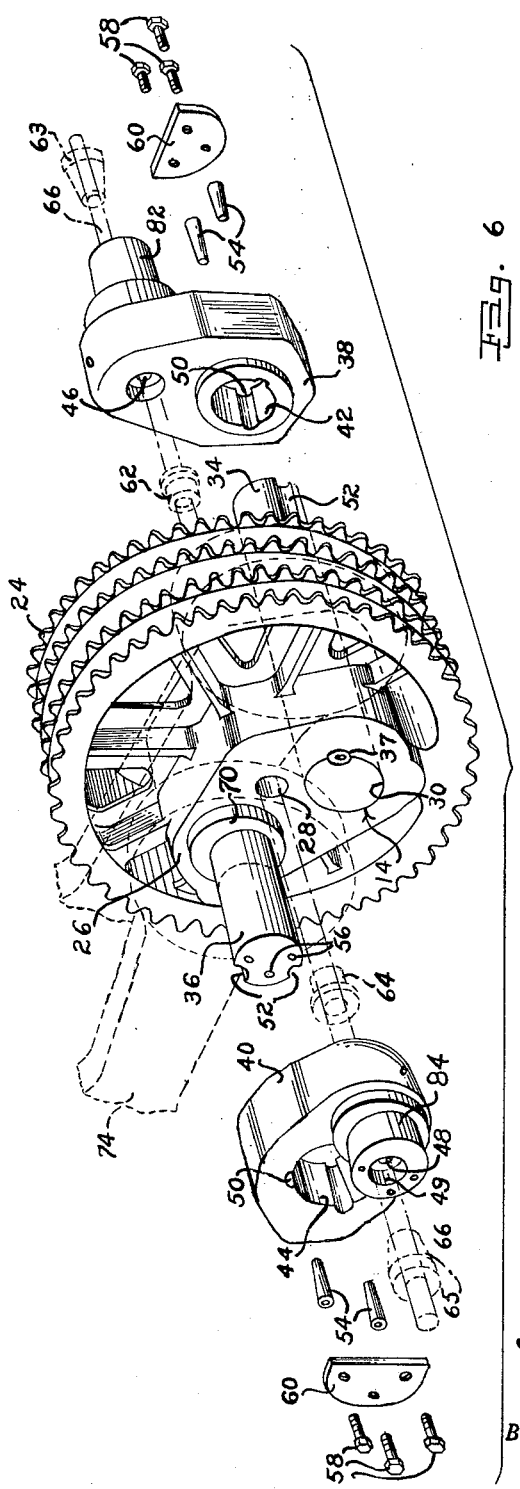
FIG. 1 is an exploded view of the crank shaft assembly and showing an aligned shaft in dot-dash outline therethrough.

The crank unit, which is generally designated by the numeral 14, is assembled from several component parts, as will be fully brought out as the description proceeds. As seen in FIG. 1, a sprocket 24 has a hub 26 through which an axial opening 28 is formed. The hub 26 has bores 30 and 32 (FIG. 3) therethrough, which bores are in parallel relation with the axial bore 28. The respective bores 30 and 32 receive members 34 and 36 respectively, from opposite sides of the hub 26, which members project outwardly of the hub to form crankpins, as will be seen from FIG. 1. Crank arms 38 and 40 have bores 42 and 44, respectively, which bores are of a size to receive crankpins 34 and 36, respectively, when the crank arms are properly expanded, as will be fully brought out hereinafter.

The crank arms 38 and 40 have bores 46 and 48, respectively, which bores will align with the axial bore 28, when the crank arms 38 and 40 are properly fitted on crankpins 34 and 36. When the crank arms 38 and 40 are in place, holes are drilled in the end of the crankpins 34 and 36 and crank arms 38 and 40 are reamed so as to be tapered, so that approximately one-half the hole, as indicated at 50, is in the crank arm, and the other half in the hole, as indicated at 52, is in the pin, so as to receive tapered pins 54, which hole and pin arrangement forms a key to prevent rotation of the crank arms 38 and 40 with respect to crankpins 34 and 36. The outer ends of the respective crankpins 34 and 36 are drilled and tapped, as indicated at 56, to receive cap screws 58, which are adapted to secure plate 60 to the ends of the shafts to prevent outward movement of the respective crank arms 38 and 40.

Bushings 62 and 64, which have cylindrical outer surfaces, are provided, which bushings are adapted to fit within the axial bore 28, and which bushings each have a bore therein of substantially the same diameter as that of the line-up bar 66. Bushings 63 and 65, the bores of which fit snugly on line-up bar 66, have their inner ends tapered so as to interengage the outer edge of the counterbores 47 and 49, respectively, when the crank shaft is being heated, expanded and assembled. When the bushings 62 and 64 are in axial bore 28 and the bores 46 and 48, of the respective crank arms 38 and 40, are aligned by tapered bushings 63 and 65 being fitted within the respective counterbores 47 and 49, the crank arms 38 and 40 on the respective crankpins 34 and 36 are aligned with respect to rotation, so that the sprocket 24 will run true with the rotational axis of outer bearing portions 82 and 84, as will be more fully explained hereinafter.

In the completed assembly of the crank arms 38 and 40, respectively, they are spaced away from the respective hub bosses 68 and 70 by the respective spacer rings 73 to accommodate anti-friction connecting rod bearings 72 for the connecting rods 74. Thus it is possible to use anti-friction bearings of the self-aligning type, and also bearings which are not split, as the anti-friction bearings 72 may be fitted onto the respective pins 34 and 36 before the arms 38 and 40 are placed in position on the respective crankpins. Plates 78 and 80 are secured to the outer bearing portions 82 and 84 of the respective arms by means of cap screws 86 and 88, respectively, which plates hold the bearings 16 in place. Bearing cover plates 90 and 92, respectively, are secured to the housing 11, as will be seen from FIG. 3, by means of cap screws 94 and 96, respectively.

In the completed assembly, the bores 46 and 48 of the crank arms 38 and 40 are plugged by means of plug members 98 and 100. Each of the plugs 98 has a lubricant fitting 102 therein so lubricant can be forced through the respective bores 46 and 48 and through branch passages 104 and 106, which passages will be lubricated while the pump or the like is in operation.

ASSEMBLY

In the fabrication of the crank unit, the bores 30 and 32, within hub 26, are made slightly less in diameter than the respective pins 34 and 36. In assembling the unit the sprocket 24 and hub 26 are heated so that the respective bores 30 and 32 will expand sufficiently to permit the respective pins 34 and 36 to be inserted thereinto. When the pins are fitted in place and the hub has been allowed to cool, holes are drilled, which holes are drilled so that approximately half of each hole is in the hub and half in the respective pin. The holes are then reamed and tapered pins 37 are inserted thereinto, substantially as shown in FIG. 3, and as shown in FIG. 4.

With the pins 34 and 36 thus positioned within the hub 26, and keyed in place by means of tapered pins 37, the sprocket 24 and hub 26, which are now cool, will have a secure gripping action on the respective pins.

Figure 5:
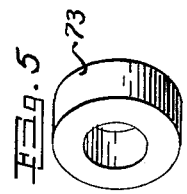
FIG. 5 is a perspective view of a spacer ring element.
Figure 2:
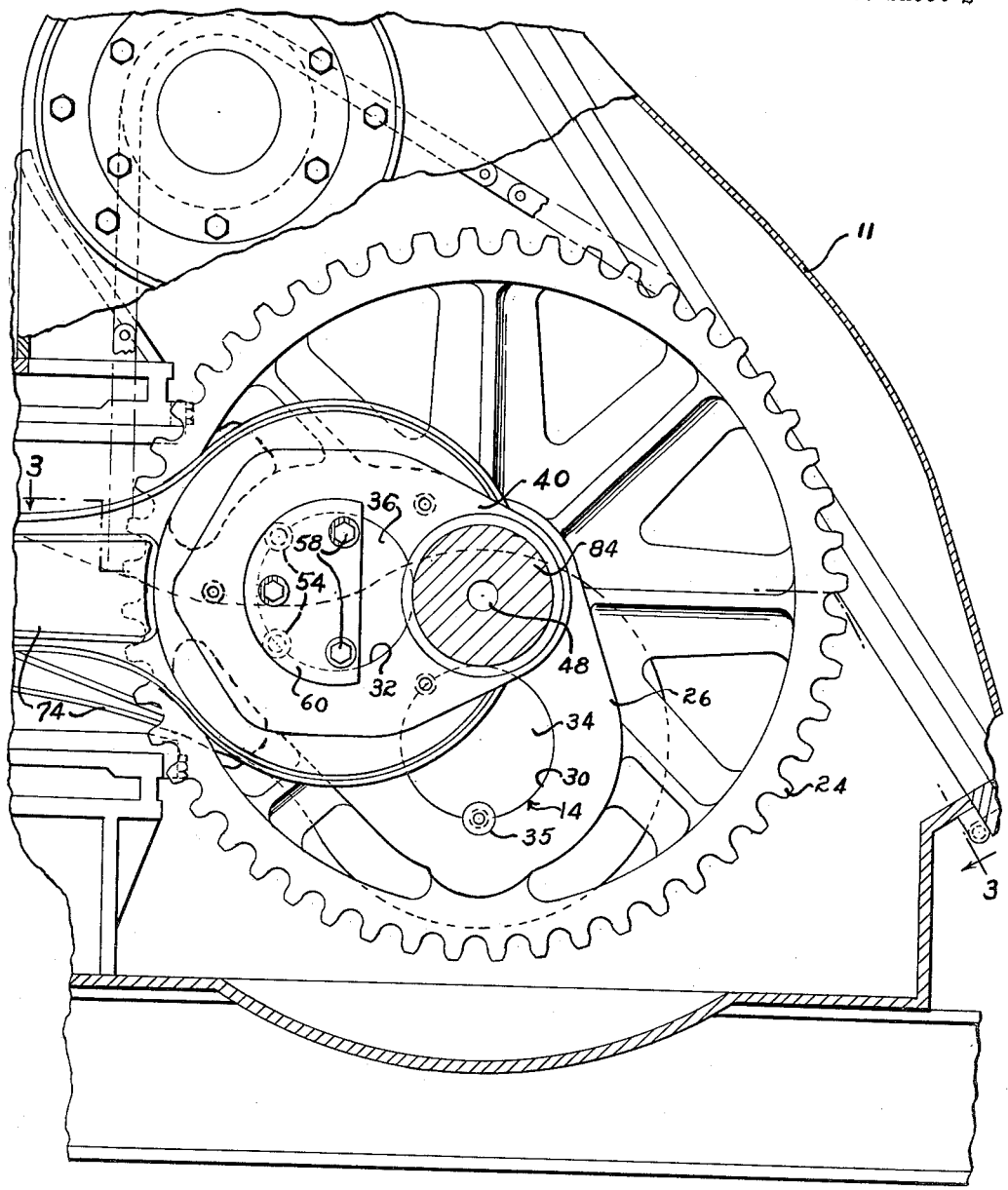
FIG. 2 is a fragmentary elevational view of a pump with parts broken away and with parts shown in section to show the details of construction of the crank shaft therein.

After this step of the assembly has been performed, spacer rings 73 (FIG. 5), of the same length as the bearing races 72, are telescoped over the respective pins 34 and 36, so as to shoulder against the respective bosses 68 and 70. The crank arms 38 and 40, which have the respective bores 42 and 44 therein, which bores are slightly smaller than the respective pins 34 and 36, are heated until the arms expand sufficiently to allow the respective bores 42 and 44 to be telescoped over the respective pins 34 and 36, and with the bushings 62 and 64 in place within axial bore 28, and with the shaft 66 fitted within the bushings, the arms 38 and 40 have their respective bores 46 and 48 telescoped over shaft 66 until the bores 42 and 44 telescope over the respective pins 34 and 36 against spacer rings 73, and with the respective arms in tight fitting relation with the spacer rings 73, with line-up bar 66 in place, tapered line-up bushings 63 and 65 are fitted snugly into counterbores 47 and 49, then the arms are allowed to cool, however, the tapered bushings 63 and 65 are moved axially outward as the cooling progresses to compensate for the size of the counterbores 47 and 49, thereby enabling an accurate fit to be maintained. Threaded plugs 98, having a center in the outer end, are then screwed into the outer ends of cranks 38 and 40. The whole crank unit is then put on centers, as in a lathe, and tested to see if it runs true. Holes 50 and 52 are then drilled so as to intersect the arms and the respective shafts, which holes are reamed to receive tapered pins 54. Approximately half of each hole, as indicated at 50, is within the crank arm, and the other half thereof, as indicated at 52, is within the shaft. Tapered pins 54 are driven into the holes thus formed, thereby assuring the respective crank arms are secured in proper fixed relation to the respective shafts. The tapered pins 54 are then removed, by screwing a threaded rod in a hole in the end of the taper pin, and the pins 34 and 36 are thus pressed out of the respective crank arms 38 and 40. The spacer rings 73 are then removed from the respective pins 34 and 36 and bearings 72 are substituted for the spacer rings 73, and with the connecting rods in place on the bearings, the crank arms 38 and 40 are heated so as to expand the bores 42 and 44 thereof to enable the crank arms to be inserted onto the respective crankpins 34 and 36 to the exact place and in the same relation as the crank arms previously occupied on the respective crankpins. Whereupon, the tapered pins 54 are reinserted into the reamed, tapered holes formed by the complementary grooved portions 50 and 52. With the tapered pins in place, the plates 60 may be bolted in place on the ends of the respective crankpins by means of cap screws 58, so as to hold the tapered pins and the crankpins against longitudinal movement. After the crank shaft has been assembled in this manner, it may be fitted within housing 11, in its main bearings 16.

It is to be pointed out that the respective crankpins 34 and 36 may be made of high strength forged alloy steel or the like, so as to withstand the hardest usage, and may be easily and effectively tested, and yet the sprockets and crank arms may be made of suitable material, thereby greatly reducing the size of the respective crankpins 34 and 36, but at the same time providing a unit which is much more likely to be free of flaws and imperfections, than would a crank shaft assembly that is cast as an integral unit.

It is to be further pointed out that, by the use of removable tapered pins 37 and 54, the respective crank pins and bearings may be removed and replaced, if they become worn, or various elements of the assembly, such as the arms or the sprockets, may be replaced without having to replace the entire assembly, thereby making possible a material reduction in the cost of producing and maintaining such units.

While the invention has been described and illustrated in some detail for use with pumps, it is to be pointed out that this arrangement may be applied to the assembly of other machinery using cranks of this character, such as engines and the like.

Having thus clearly shown and described the invention what is claimed as new and desired to secure by Letters Patent is:

1. A crank shaft for a reciprocating pump comprising a hub member having two holes extending therethrough parallel to the rotational axis thereof and spaced from said axis, a sprocket integrally formed with said hub member, shafts secured in said holes and extending outwardly from said hub member in opposite directions, with the respective axes of said shafts in parallel relation with the rotational axis of said hub, a crank member attachably secured to each of said shafts at a spaced distance outwardly from said hub, a second series of shafts, each of said last-mentioned shafts being integrally formed on one of said crank members and extending outwardly therefrom with its axis in parallel relation with the axes of said first-mentioned shafts, said sprocket forming power transmission means for said crank shaft.

2. A crank shaft for a heavy duty reciprocating pump comprising a hub member, having two holes, extending therethrough parallel to the rotational axis thereof and spaced substantially 90 degrees apart and spaced from said rotational axis thereof, a drive sprocket integrally and externally formed with said hub member, pins shrink fitted and keyed to said hub, in said holes and extending outwardly from said hub member in opposite directions, with the respective axes of said pins in parallel relation with the rotational axis of said hub, a crank member attachably secured to each of said pins at a spaced distance outwardly from said hub, a pair of shafts, each of said shafts being integrally formed on one of said crank members and extending outwardly therefrom with its axis in parallel relation with the axes of said pins and said sprocket and said crank members being securely fitted on and pinned to said crank pins.

References Cited in the file of this patent
UNITED STATES PATENTS

| | | |
|---|---|---|
| 393,211 | Chase et al. | Nov. 20, 1888 |
| 1,347,178 | Schenk | July 20, 1920 |
| 1,485,645 | Tindale | Mar. 4, 1924 |
| 1,552,746 | Kizer | Sept. 8, 1925 |
| 1,567,986 | Ricardo | Dec. 29, 1925 |
| 1,652,617 | Eurit | Dec. 13, 1927 |
| 1,705,375 | Ricardo | Mar. 12, 1929 |
| 2,249,802 | Wilson | July 22, 1941 |
| 2,364,109 | Taylor | Dec. 5, 1944 |
| 2,380,099 | Dusevoir | July 10, 1945 |
| 2,475,011 | Chilton | July 5, 1949 |
| 2,643,145 | Sundbom et al. | June 23, 1953 |
| 2,730,912 | Marinelli | Jan. 17, 1956 |
| 2,899,742 | Wilson | Aug. 18, 1959 |

FOREIGN PATENTS

| | | |
|---|---|---|
| 645,233 | France | June 26, 1928 |